United States Patent [19]

MacPhee et al.

[11] 4,394,870

[45] Jul. 26, 1983

[54] SYSTEM FOR MIXING CONCENTRATE AND WATER TO FORM FOUNTAIN SOLUTION FOR OFFSET PRINTING PRESSES

[75] Inventors: John MacPhee, Rowayton; David Wirth, Norwalk, both of Conn.; John St. John, Blue Jay, Calif.

[73] Assignee: Baldwin-Gegenheimer Corporation, Stamford, Conn.

[21] Appl. No.: 314,012

[22] Filed: Oct. 22, 1981

Related U.S. Application Data

[63] Continuation of Ser. No. 793,716, May 4, 1977, abandoned.

[51] Int. Cl.³ .............................................. G05D 11/02
[52] U.S. Cl. ..................................................... 137/99
[58] Field of Search ...................... 91/304, 323; 137/99

[56] References Cited

U.S. PATENT DOCUMENTS 504,283  8/1893  Shepperd ............................. 91/304

FOREIGN PATENT DOCUMENTS 759424  10/1956  United Kingdom ................. 137/99

Primary Examiner—Martin P. Schwadron
Assistant Examiner—J. R. Shay
Attorney, Agent, or Firm—Morgan, Finnegan, Pine, Foley & Lee

[57] ABSTRACT

A system for mixing concentrate and water continuously and automatically including a water supply system and a concentrate system which systems feed into a common conduit to mix the concentrate and water to form a fountain solution. The water supply system has a water motor and is interconnected with valves for controlling the flow of water to and from the water motor. The concentrate system includes a concentrate pump and a concentrate supply valve for controlling the flow of concentrate to and from the concentrate pump.

The water motor is interconnected with the concentrate pump to thereby drive the concentrate pump and the stroke of the concentrate pump is variable to permit variations in the concentrate and water mixture.

The operation of the water system and the concentrate system is controlled by a pneumatic system which is activated by the water motor.

5 Claims, 11 Drawing Figures

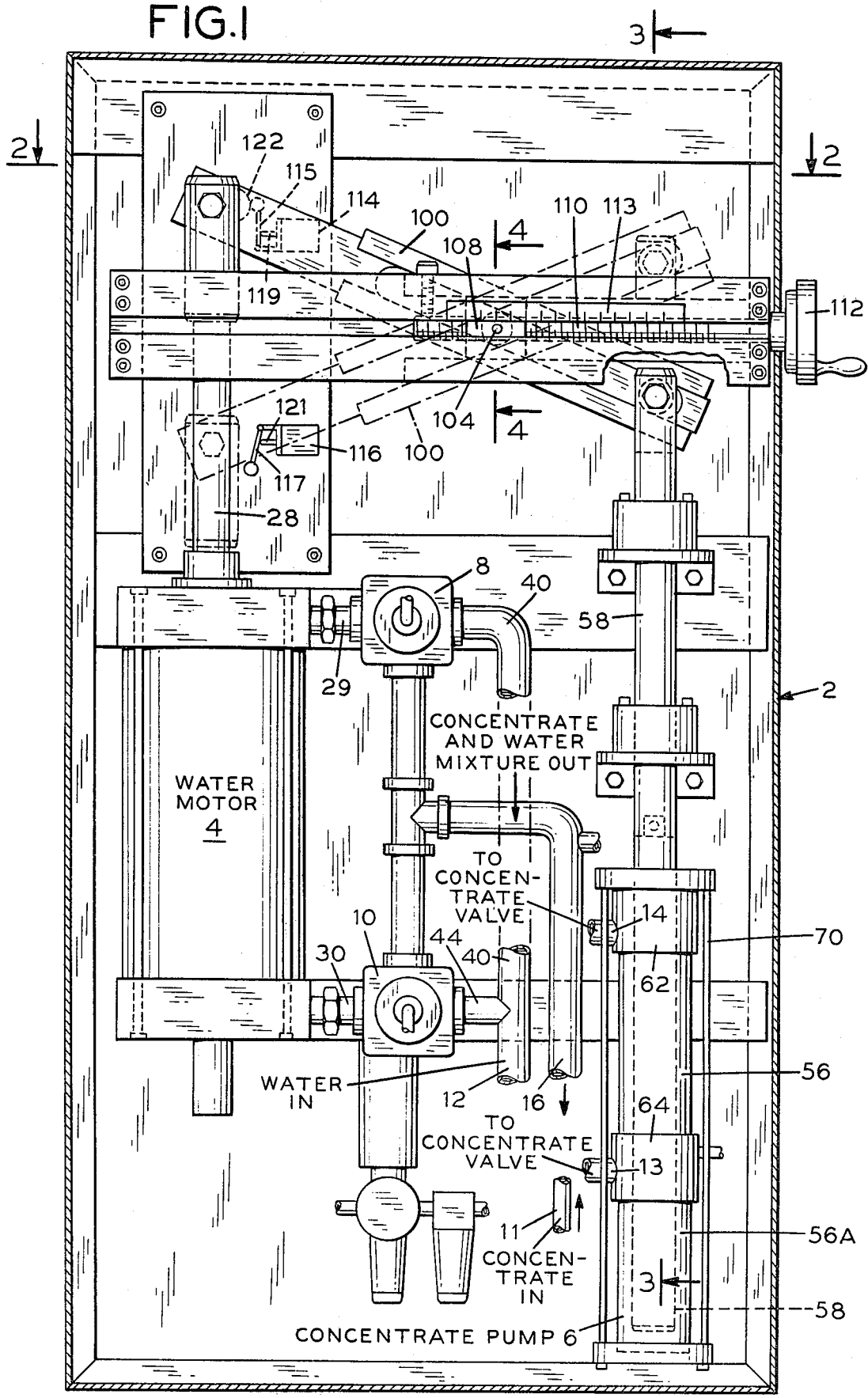

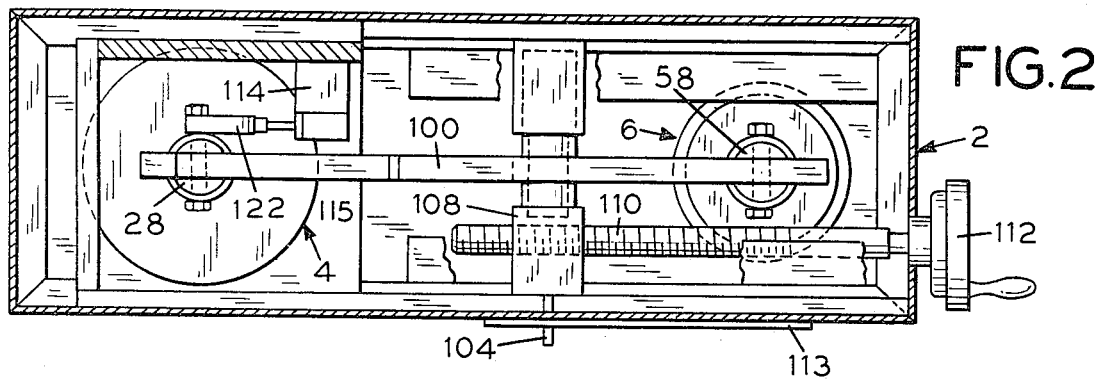
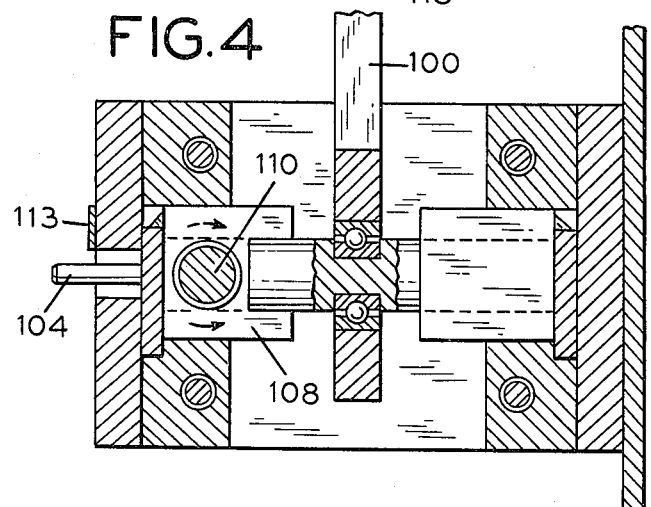
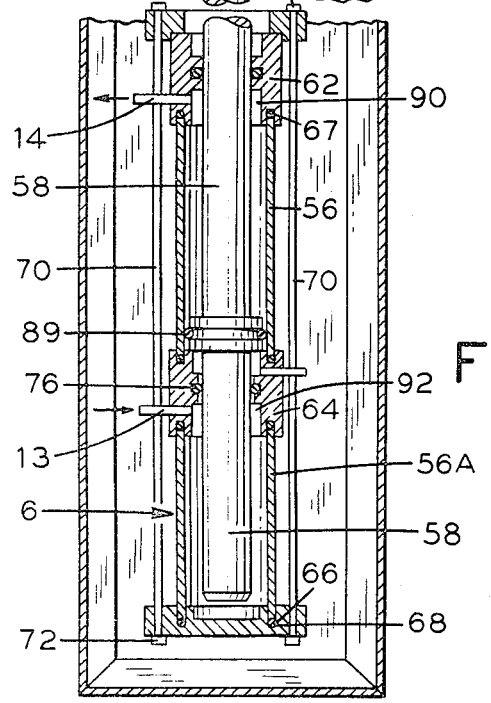
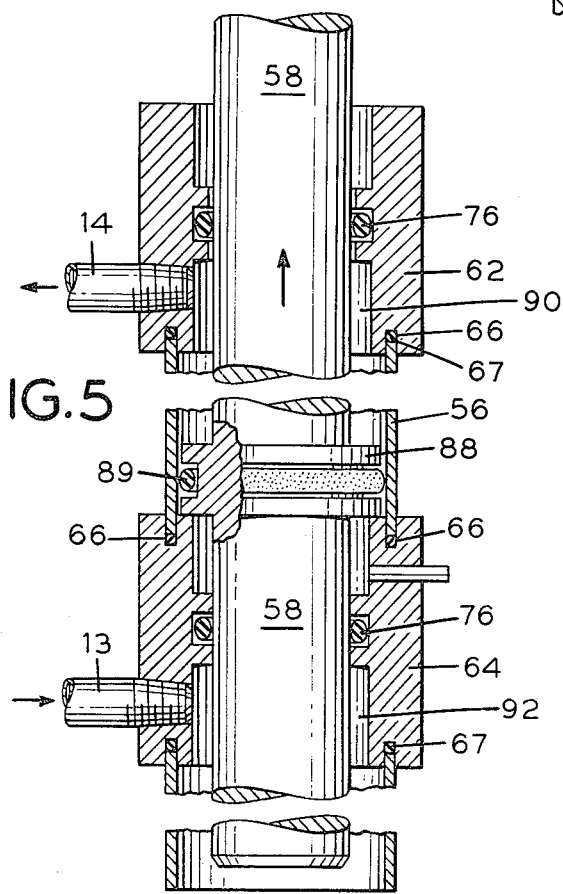

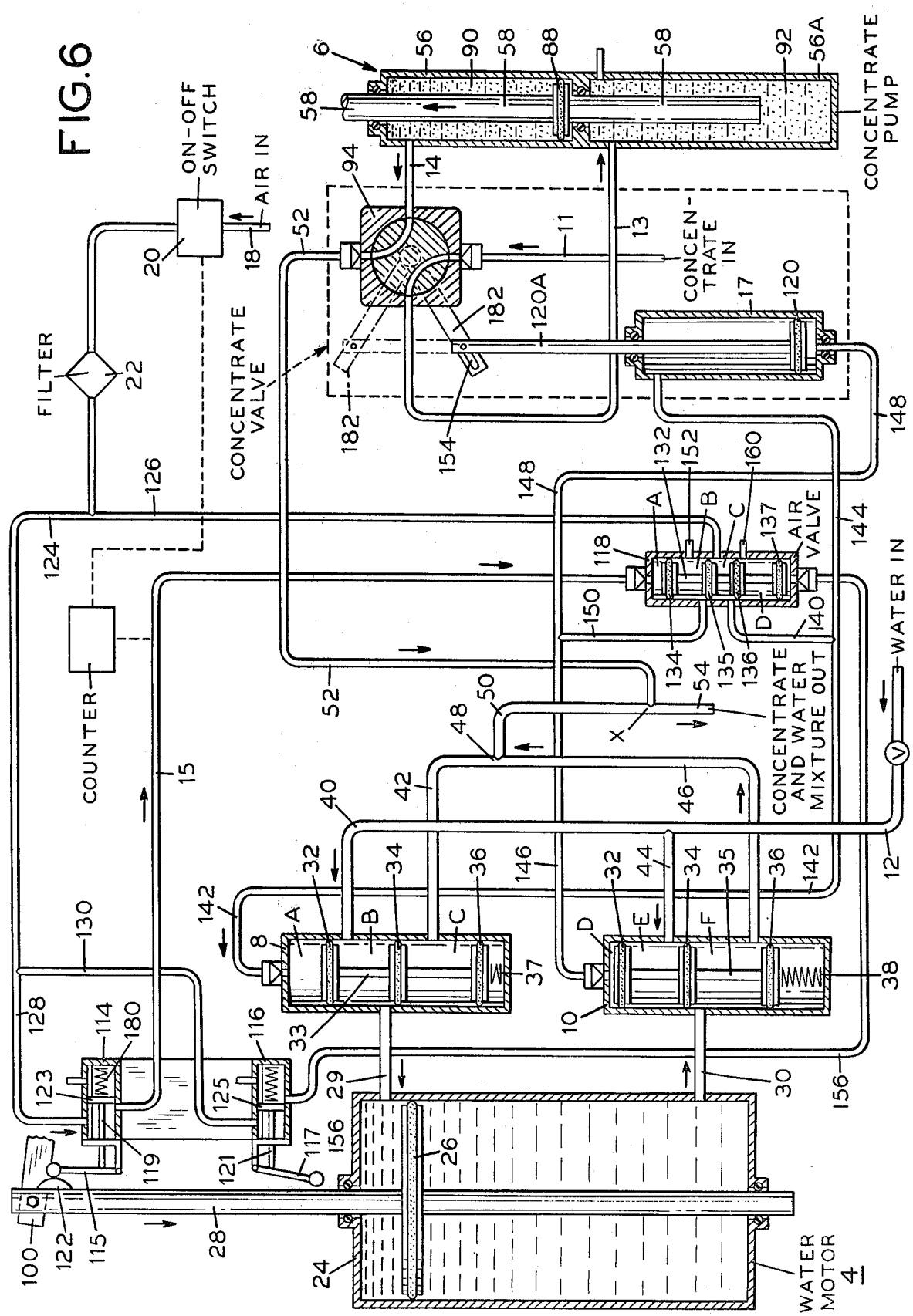

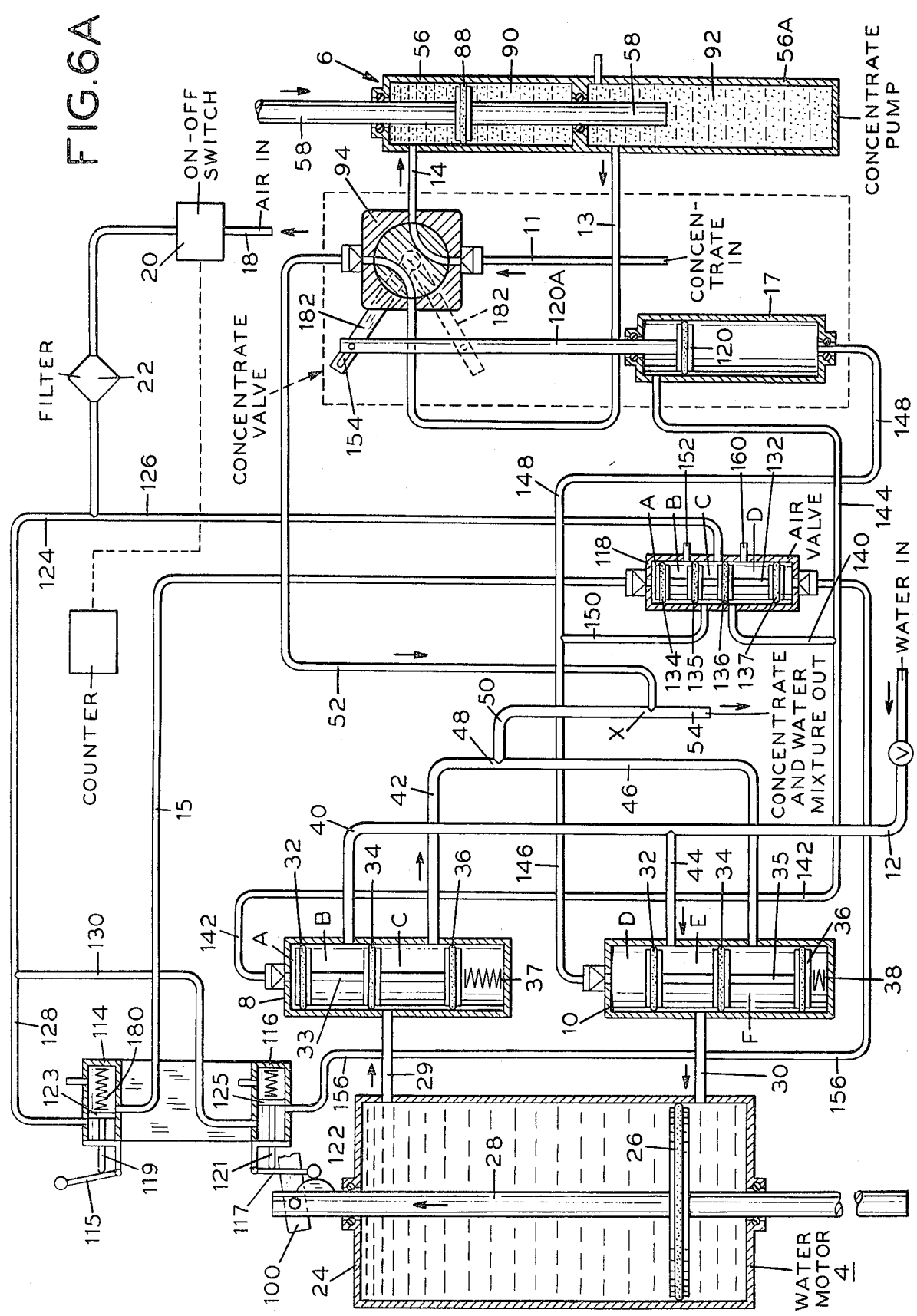

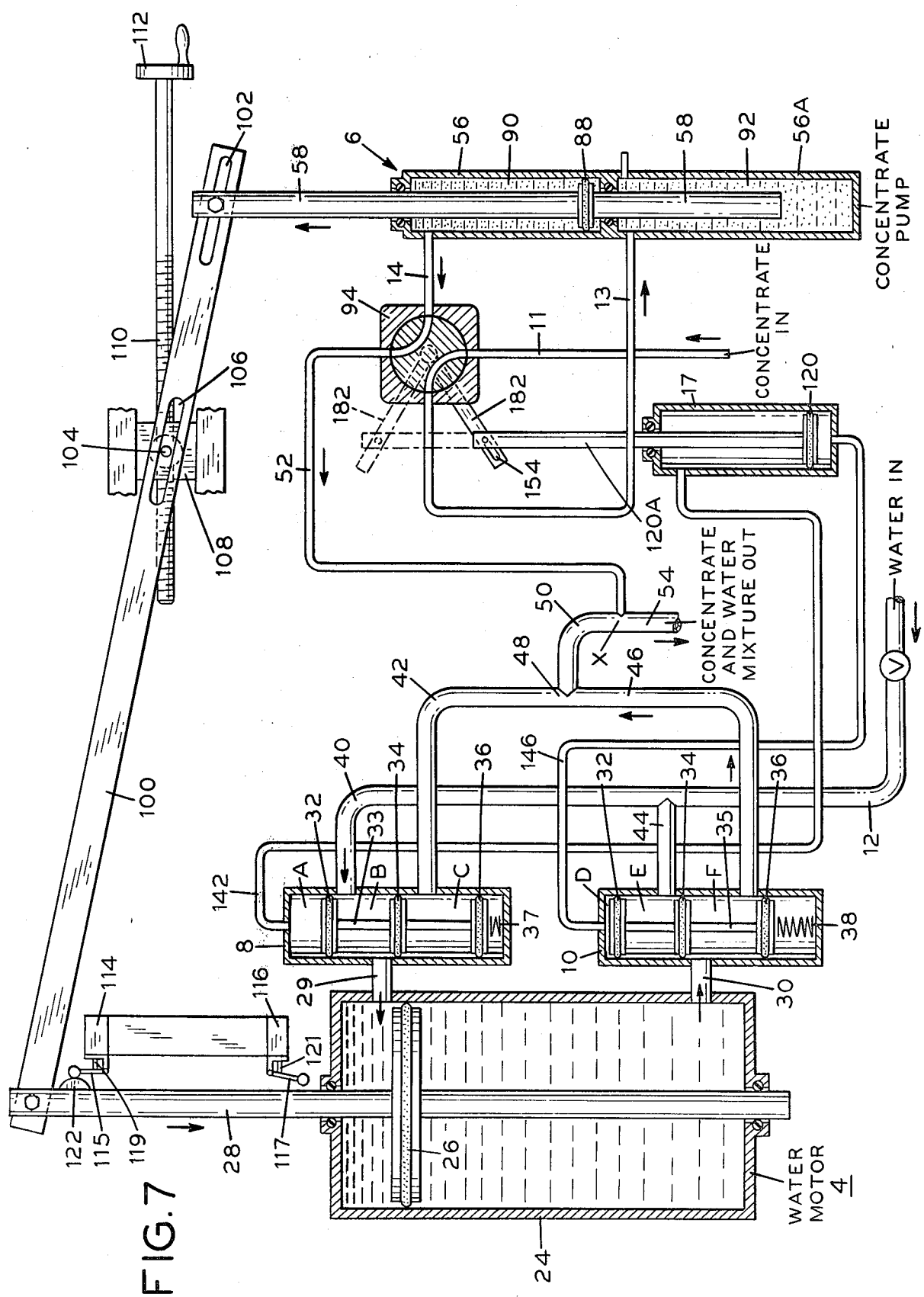

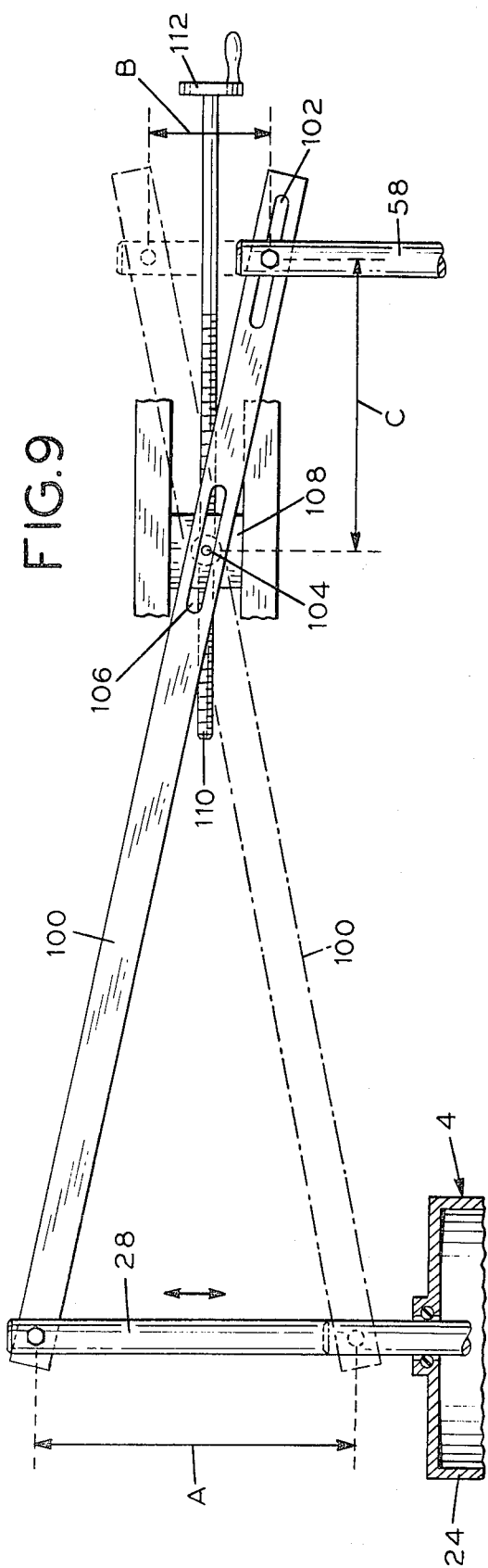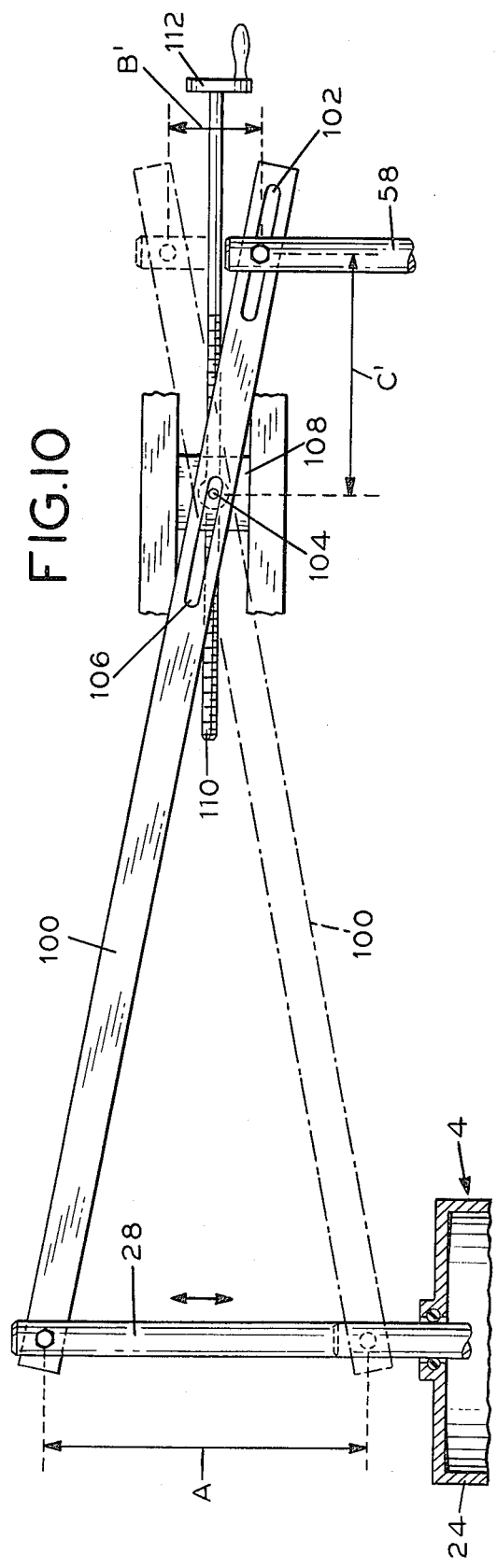

SYSTEM FOR MIXING CONCENTRATE AND WATER TO FORM FOUNTAIN SOLUTION FOR OFFSET PRINTING PRESSES

This is a continuation, of application Ser. No. 793,716 filed May 4, 1977, now abandoned.

BACKGROUND OF THE INVENTION

This invention relates to a new and improved system for mixing fountain concentrate and water in the desired proportions continuously and automatically.

As is known, offset printing presses are usually provided with a fountain which is usually filled with a solution of gum arabic dissolved in water and a slight proportion of chromic or phosphoric acid. Such mixtures are known as "acid" type fountain solutions and have a pH of less than 7.0. More recently, alkaline fountain solutions have been developed primarily for use in printing on uncoated paper or "newsprint". These solutions are used to the largest extent on newspaper presses and consist of water mixed with a small amount of a chemical concentrate having a pH of greater than 7.0. These solutions are known as "alkaline" type fountain solutions and there exists a need for high capacity automatic mixing devices for such "alkaline" type fountain solutions.

With either type of solution damping rollers apply the fountain solution to the non-printing portions of the printing plate on the plate cylinder of the press to ensure that no ink from the inking rollers will be received on those dampened parts of the plate.

Numerous types of mixing devices for the "acid" type fountain solutions are found in the prior art and are described in the following U.S. Pat. Nos. 3,166,095; 3,223,294; 3,233,619; 3,358,704 and 3,893,470 all owned by the assignee of the present application.

All of these devices were originally adapted for the mixing of fountain solutions of the "acid" type and are quite suitable for that purpose.

Alkaline fountain solutions, as noted previously, are largely used in newspaper presses where the capacity must be very high since newspaper presses run at very high printing speeds and print many webs at a time.

The prior art devices while mechanically satisfactory for alkaline solutions lack sufficient capacity to operate satisfactorily with high speed presses. For example, some of the prior art devices function with only a two or three gallon supply of concentrate which would require frequent refilling meaning loss of time, manpower and production.

One of the features of the present invention is a capacity of over 400 gallons per hour which is approximately four times the capacity of some prior art devices. The invention further permits concentrate to be supplied from 30 or 55 gallon drums rather than the 3 gallon bottles used by some of the prior art devices while at the same time obtaining an accuracy of plus or minus one-quarter ounce of concentrate per gallon of solution.

The invention herein although developed primarily for "alkaline" solutions is also usable with "acid" solutions and for this reason the expression "concentrate" is used to connote either type of fountain concentrate.

With the foregoing in mind it is an object of this invention to provide a new and improved system for mixing concentrate and water to form fountain solutions for a printing press.

Another object of this invention is to provide a new and improved system for mixing concentrate and water having a water system, a concentrate system, a pneumatic system and means interconnecting said systems whereby the water system and the concentrate system are controlled by the pneumatic system to continuously and automatically prepare fountain solutions.

Another object of this invention is to provide a new and improved system for mixing concentrate and water having a water motor which drives a variable stroke concentrate pump.

A further object of this invention is to provide a new and improved system for mixing concentrate and water wherein the relationship of the strokes of the water motor and concentrate pump are constant during a given period of operation, but either stroke can be adjusted, so as to change concentration.

A still further object of this invention is to provide a new and improved system of mixing concentrate and water having a novel concentrate pump.

Another object of this invention is to provide a new and improved self-purging pump.

Another object of this invention is to provide a new and improved continuous system for mixing concentrate and water having a water system including a water motor, a concentrate system and a pneumatic system wherein the water system and concentrate system are controlled by the pneumatic system and wherein the pneumatic system is actuated by the water motor.

Additional objects and advantages of the invention will be set forth in the description which follows and in part will be obvious from the description. The objects and advantages being realized and obtained by means of the instrumentalities, parts, apparatus and system being particularly pointed out in the appended claims.

The invention consists of the novel parts, steps, constructions and improvements shown and described.

The invention comprises an automatic and continuous system for mixing predetermined proportions of concentrate and water.

In accordance with this invention means is provided for feeding a constant fixed amount of water into the system with means for varying, as desired, the amount of concentrate fed into the system so that a predetermined proportions of concentrate and water will be mixed.

This means includes a positive displacement pneumatically controlled water motor having a piston therein with a predetermined fixed stroke which displaces a predetermined quantity or volume of water with each stroke. This piston is connected to a lever which is pivoted intermediate of its ends. One end of the pivoted lever is connected to the piston of the positive displacement water motor and the other end is connected to a novel concentrate pump. The position of the intermediate pivot point is adjustable between the water pump and the concentrate pump and since the displacement of water motor piston is constant, the stroke of the concentrate pump can be changed and hence the proportion of concentrate to water can be varied.

The system is pneumatically controlled for reliability, convenience, low cost and safety.

The unit described herein is self-contained and needs only an outside supply of air and water for operation.

The pneumatic system is put into operation by the movement of the piston rod of the water motor which at the upper and lower ends of its stroke engages mechanically actuated pneumatic valves which control and direct the flow of air. The two valves are pneumatically connected to an air logic valve and by the momentary feeding of air can move the air logic valve from one position to another. The invention further includes two pneumatically actuated water motor valves which control the flow of water to and from the water motor. Movement of the water valve is determined by the position of the air logic valve. The air logic valve also controls movement of the concentrate control valve spool by means of a rotary air cylinder and linkage. The concentrate control valve spool is connected to a lever which lever positions the concentrate valve.

The position of the concentrate valve directs the flow of concentrate from the concentrate reservoir through the concentrate pump for ultimate mixture with the water to form the fountain solution.

The invention further includes a novel concentrate pump which is self-purging to provide increased accuracy in operation.

Briefly described, the invention comprises a system for mixing predetermined quantities of concentrate and water to form a fountain solution for use in printing presses. The invention includes a water motor and a concentrate pump. The water motor and the concentrate pump are interconnected and constructed and arranged so that the quantity of water fed into the system remains constant while the amount of concentrate fed into the system can be varied by adjusting the interconnection between the water motor and the concentrate pump.

There are first and second water motor valves which control the flow of water into and out of the water motor. The positions of the first and second water motor valves is determined by pneumatic means. There is a concentrate pump having a concentrate control valve which controls the flow of concentrate into and out of the concentrate pump. The position of the concentrate valve is determined by pneumatic means.

The water motor and the concentrate pump are interconnected by conduit means which bring the water and concentrate together for mixing purposes.

The overall and sequential operation of the system is controlled by a pneumatic control system which includes an air logic valve. The air logic valve positions the first and second water motor valves and controls the position of the concentrate valve.

There is an air supply means for the pneumatic system and a pair of mechanically actuated pneumatic valves which direct the flow of air. These valves are actuated by cams on the piston rod of the water motor which are positioned to contact one valve at each end of its stroke. The actuation of these valves determine the sequence of operation.

The accompanying drawings which are incorporated in and constitute part of this specification illustrate an embodiment of the invention and together with the description serve to explain the principles of the invention.

OF THE DRAWINGS

FIG. 1 is a front view of the device with the cover removed.

FIG. 2 is a plan view taken generally along line 2—2 of FIG. 1.

FIG. 3 is a vertical section taken along line 3—3 of FIG. 1.

FIG. 4 is a vertical section, to a somewhat larger scale, taken along line 4—4 of FIG. 1.

FIG. 5 is a detailed view, drawn to a larger scale of the concentrate pump.

FIG. 6 is a flow diagram of the complete device showing all concentrate, water and air actuating lines when the device is in one position.

FIG. 6A is a flow diagram of the complete device showing all concentrate, water and air actuating lines when the device is in the opposite position than that shown in FIG. 6.

FIG. 7 is a flow diagram showing the lever tilting bar prior to its downward stroke, the air lines being omitted for clarity.

FIG. 9 is a diagrammatic view showing the lever in one axial position relative to the index scale.

FIG. 10 is a diagrammatic view similar to FIG. 9 showing the axial position of the lever moved to another position.

Figure 8:
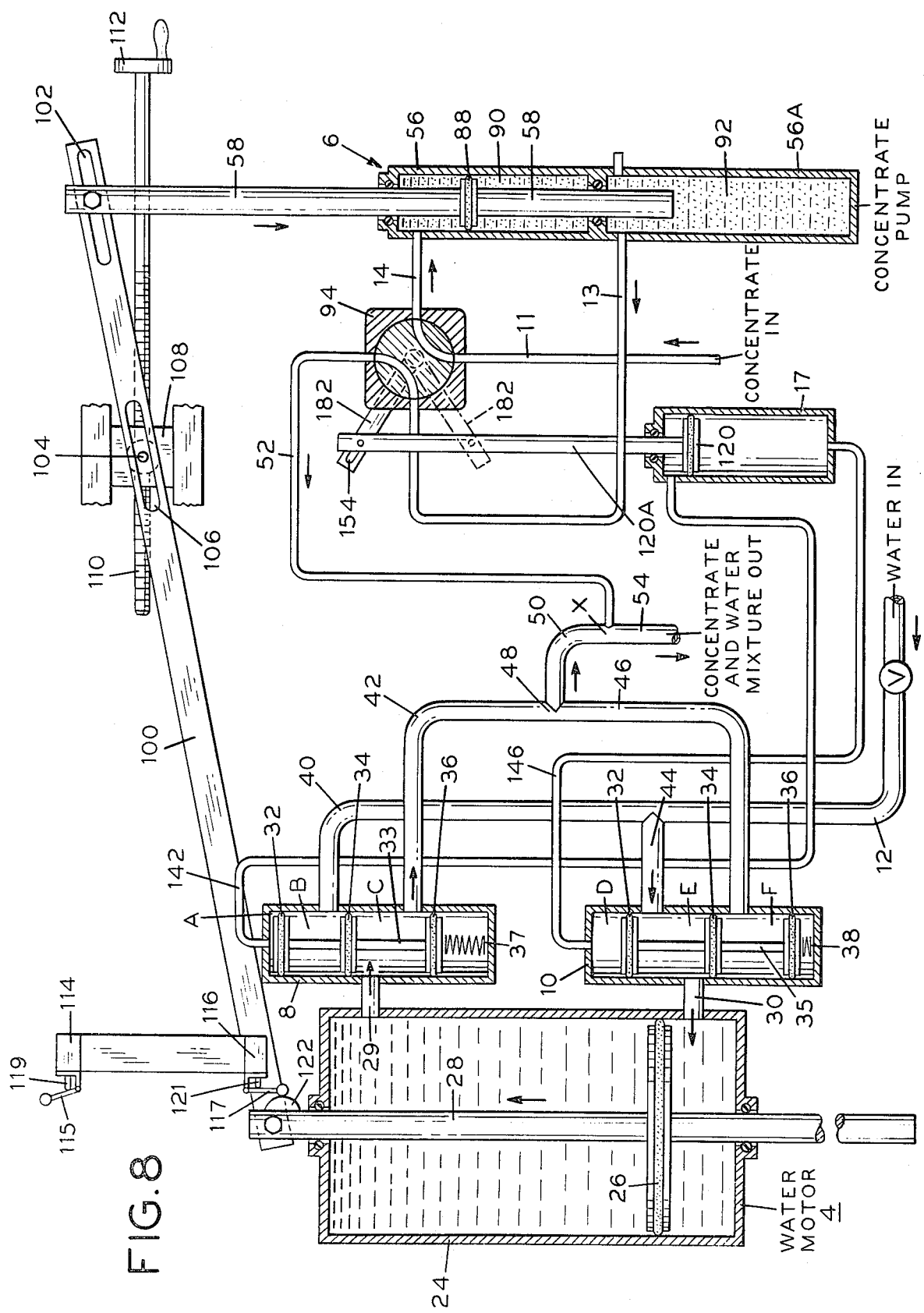
FIG. 8 is a flow diagram similar to FIG. 7 with the lever shown prior to its upward stroke.

Referring now to the drawings (FIG. 1) there is shown a housing 2 for enclosing the device or system of this invention. Mounted within the housing is the water motor 4 and the concentrate pump 6. This figure also illustrates the first water motor valve 8 and the second water motor valve 10. The conduit 12 is a water supply conduit whereas the conduit 11 is a concentrate supply conduit. Concentrate is directed to and from the concentrate pump 6 through conduits 13 and 14 (see FIG. 6).

The water and concentrate are mixed together in predetermined proportions to form a fountain solution as these ingredients are discharged from the system or device through the discharge conduit 16.

Referring to FIG. 6 it will be seen that there is an air supply conduit 18 which, as will be explained subsequently, is used in the pneumatic system to control the operation of the system. The air is turned on or off by switch 20 and passes through filter 22 before passing into the air conduit system.

In accordance with this invention a water system including water motor means is provided for supplying a constant volume of water to be mixed with the concentrate to form the fountain solution.

The water motor means (see e.g. FIG. 6) includes a housing 24 in which there is positioned a vertically movable piston 26 mounted on a piston rod 28 in any convenient fashion. Located adjacent each end of the housing 24 are first and second conduits 29 and 30, respectively, which permit egress or ingress to the water motor depending on the cycle of the operation. Positioned in direct communication with the conduits 29 and 30 are first water motor valve 8 and second water motor valve 10. Positioned within each of the water motor valves are three piston heads 32, 34 and 36 respectively mounted on rods 33 and 35, respectively which are normally biased in one direction by springs 37 and 38. The three piston heads form three operating chambers A, B and C in the first water motor valve and operating chambers D, E and F in the second water motor valve. The fourth chamber for each water motor valve it will be observed is occupied by the springs 37 and 38. Positioned on opposite sides of the center or middle piston head 34 of each water motor valve are conduits 40 and 42 for the first water motor valve and conduits 44 and 46 for the second water motor valve. The conduits 40 and 44 are in communication with the water supply conduit 12. The conduits 42 and 46 are joined at 48 into the common conduit 50 which is merged with concentrate conduit 52 so that there is a mixing conduit 54 where the concentrate and water are mixed.

In accordance with this invention a concentrate system means is provided for supplying a predetermined amount of concentrate to be mixed with the water to form the fountain solution.

As embodied, this means includes a concentrate pump 6 shown in detail in FIGS. 3 and 5.

The concentrate pump includes an outer casing divided into two tubular members 56 and 56A within which is positioned a piston rod 58. The tubular member 56 engages flange member 62 at one end and flange member 64 at the other. The end of tubular member 56 is positioned in grooves 66 in the flanges 62 and 64 while the end of the tubular member 56A extends into a groove 66 in the bottom of intermediate flange 64 and in groove 66 in a bottom flange 68. The grooves 66 have O-rings 67 in the bottom for sealing purposes. The assembly is held together by rods 70 having nuts 72 or the like at their ends.

The flanges 62 and 64 are provided with O-rings 76 for sealing purposes.

Mounted, in conventional fashion, on the piston rod 58 is a piston 88 having a sealing O-ring 89. The piston 88, it will be noted is positioned in the chamber 90 formed by the tubular member 56 and the flanges 62 and 64. The piston rod 58 extends beyond the piston 88 and into chamber 92 formed by the flange 64, the bottom flange 68 and the tubular member 56A.

As noted previously, there is a concentrate line 14 communicating with the upper end of the chamber 90 and a line 13 communicating with the upper end of the chamber 92. Because the concentrate lines 13 and 14 are positioned immediately adjacent the ends of chambers 90 and 92 there is a minimum volume for air entrapment and the concentrate pump is, therefore, self-purging. Thus movement of the piston 88 and the lower portion of piston rod 58 will remove air from the chambers 90 and 92.

It will be noted, as described, hereafter, that the concentrate conduits 13, 14 can either be concentrate supply lines or concentrate discharge lines depending on the cycle of operation.

In accordance with this invention means is provided for directing concentrate to and from the concentrate pump and for mixing with the water.

As embodied, this means includes a concentrate valve 94 which can take the position shown in FIGS. 6 and 7 or FIGS. 6A and 8.

In the position of FIGS. 6 and 7 the concentrate supply is fed to the valve through line 11 and thence to bottom chamber 92 of the concentrate pump. At the same time concentrate from the upper chamber 90 passes through conduit 15, through the valve 94 through conduit 52 to be mixed with the water in the conduit 54. In the position shown in FIGS. 6A and 8 the concentrate is directed by the concentrate supply valve 94 to the upper chamber 90 of the concentrate supply pump while the lower chamber 92 of the concentrate pump directs concentrate through the concentrate valve and conduit 52 for mixture with the water in conduit 54.

In accordance with this invention means is provided for adjusting the amount of concentrate fed to the system with respect to the constant volume of water supplied to the system.

This means is illustrated primarily in FIGS. 2, 4, 9 and 10. For reasons explained subsequently the stroke of piston 26 and piston rod 28 is always constant when in operation. However, this constant stroke can be changed if desired. In one embodiment the stroke is eight (8) inches. Pivotally attached, by any convenient means, to one end of the piston rod 28 is a lever tilting bar 100. The other end of the lever tilting bar 100 is pivotally attached to the end of the piston rod 58 of the concentrate pump. The lever tilting bar has a slot 102 therein at the point of pivotal attachment. Intermediate the attachment of the lever tilting bar is an adjustable pivot point 104 positioned within slot 106 of the tilting bar 100. The adjustable pivot point 104 is mounted on a threaded sliding block 108. The threaded sliding block 108 is in threaded engagement with a threaded shaft 110 having a handle 112 at one end and extending to the outside of the housing 2.

Mounted on the front of the housing is an indicator strip 113 (FIGS. 2 and 4) which is adjacent the adjustable pivot or indicator member 104. The indicator strip 113 is calibrated so as to inform the operator of the amount of concentrate being fed to the system or preferably the proportion of concentrate and water being mixed together.

The relationship between the stroke of the water pump piston rod 28 and the stroke of the concentrate pump piston rod 58 is illustrated in FIGS. 9 and 10. The relationship, it will be understood, determines the amount of concentrate fed to the system and hence the proportion of concentrate and water being mixed to form the fountain solution.

As shown in FIG. 9, the stroke of piston rod 28 is designated as A, the distance between the adjustable pivot 104 and the piston rod 58 is C resulting in a stroke for the piston rod 58 of B.

FIG. 10 illustrates what happens when the adjustable pivot point 104 is moved towards the pivot between the tilting bar and the concentrate piston 58 to a distance designated C'. Such a movement reduces the stroke of the piston rod 58 to a distance designated B' and hence reduces the amount of concentrate to the fixed amount of water supplied by the water motor.

In accordance with this invention pneumatic means is provided for controlling the sequential operation of the system.

As embodied and shown in FIGS. 6 and 6A the pneumatic means includes an upper mechanically actuated pneumatic valve 114 and a lower mechanically actuated pneumatic valve 116, and air logic valve 118 and air operated piston 120 positioned within the cylinder 17.

The sequence of operations is governed by the mechanically actuated pneumatic valves 114 and 116 which are activated by the cam 122 on the piston 28 of the water motor 4. The valves 114 and 116 include levers 115, 117 adapted to engage the piston rods 119, 121 for pistons 123, 125 which pistons control the flow of air through the valves. As noted previously, air is supplied to the system through line 18. The supply air line 18 is divided into air supply lines 124 and 126. The air supply line 124 is itself divided into air line 128 leading to the pneumatic valve 114 and air line 130 leading to the pneumatic valve 116 while air line 126 leads to the air logic valve 118.

FIGS. 6 and 7 illustrate the operation of the device just prior to the downstroke of the piston 26. In this position the cam 122 has moved the piston 123 against spring 180 so that supply air is directed through the valve 114 and through air line 15 to give a momentary air signal to the top end of the air logic valve 118. It will be understood that the piston rod 28 is continuously moving up and down and so that the mechanically actuated pneumatic valves 114 and 116 give only a momentary supply of air to the air logic valve 118. In the position of FIGS. 6 and 7 the momentary air signal moves the air logic valve to the down position shown in FIG. 6.

The air logic valve contains a shaft 132 having four pistons 134, 135, 136 and 137 thereon forming chambers A, B, C and D. With the air logic valve in this position of FIG. 6 supply air goes from air line 126 through chamber C to air line 140. The air line 140 divides into air line 142 leading to the top of first water motor valve 8 and into air line 144 leading to one end of piston means 120 which controls the position of the concentrate valve 94.

By virtue of this position of the air logic valve the piston assembly 32, 34, 36 and 33 in the water valve is forced downwardly against spring 37 so that water passes from the water line 40 through chamber B of the water valve 8 to the upper portion of housing 24 of the water motor 4 to thereby force the piston 26 downwardly. This movement forces water from below piston 26 through line 30, through chamber F of the second water motor valve 10 and into water line 46 where at point 48 the water will go into line 50 for mixture with the concentrate in line 54 with concentrate from line 52. It will be appreciated that the water does not go into line 42, above, point 48, FIG. 6 because the water above this point is dead ended or blocked against further movement since chamber C is filled with water thus preventing further movement of the water.

When the air logic valve 118 is in this position air also is vented through line 146 from chamber D of the water motor valve 10 and through 148 from the bottom of the piston 120 in cylinder 121 controlling the concentrate valve 94. These lines 146 and 148 merge with line 150 which leads to chamber B of the air logic valve 118. Chamber B of the air logic valve is vented to the atmosphere through air vent 152.

At this time supply air is directed to the top of piston means 120. The piston rod 120A which is pivotally attached to lever 182 in slot 154 of the lever 182 positions the concentrate valve in the position shown in FIG. 6 and FIG. 7.

FIG. 6A is the counterpart to FIG. 6 and shows the position of the system and its parts with cam 122 momentarily opening the lower pneumatic valve 116. Thus the system in FIG. 6A and FIG. 8 is shown just prior to the upward stroke of the piston 26 and piston rod 28.

In this position air comes through air supply line 18 and divides into air lines 124 and 126. In this case, however, valve 116 is open and valve 114 is closed and the supply air goes from air line 124 to air line 130 through the valve 116 and into air line 156. Air line 156 communicates with the bottom of the air logic valve 118 to move the pistons 134, 135, 136, and 137, upwardly to the position shown in FIG. 6A. In this position chamber C of the air logic valve receives supply air from air supply line 126.

Chamber C of the air logic valve permits supply air from air line 126 to pass to air line 150. The air line 150 connects to air line 146 and to air line 148. The air line 146 is connected to the top of the second water motor valve 10 and moves the pistons 32 etc. downwardly against the bias of spring 38. When in this position water can pass from water supply line 12 through water line 44 and into chamber E of the second water motor valve 10. The water then passes through water line 30 and into casing 24 below the water motor piston 26. This, of course, tends to move the water motor piston 26 upwardly. The upward movement of piston 26 forces water out of the position above piston 26 through line 29 and into chamber C which communicates with water line 42. Water line 42 joins with water line 50 and at point X joins the concentrate and the concentrate and water are then mixed in line 54. The water in line 42 will not go below point 48 since water line 46 leads to chamber F which is filled with water thus preventing further water flow.

At this stage of the operation any air in chamber A of the first water motor valve 8 will be vented through lines 142 and 140 to chamber D of the air logic valve 118. Similarly, air above the piston 120 in the concentrate control valve cylinder passes through air line 144 and 140 to the chamber D of the air logic valve 118. Chamber D includes an air vent 160 which discharges the air to the atmosphere.

It will be further understood that there is no movement of water in water line 40 or in water line 46 since the water in these lines is blocked or dead ended against further movement for the same reasons previously explained.

What is claimed is:

1. A system for continuously and automatically mixing concentrate and water to form fountain solution comprising:
   (a) a water motor including a reciprocating piston having a stroke of fixed distance;
   (b) first water motor valve having first and second operating chambers;
   (c) a second water motor valve having a first and second operating chambers;
   (d) a first conduit at one end of said water motor adapted to communicate with first and second operating chambers of said first water motor valve;
   (e) a second conduit at the other end of said water motor adapted to communicate with said first and second operating chambers of said second water motor valve;
   (f) third water conduit means extending from one of said operating chambers in said first and second water motor valves;
   (g) a concentrate pump having a cylinder and piston therein and adjustable means interconnecting said water motor piston and said concentrate pump piston;
   (h) a concentrate valve in fluid communication with said concentrate pump;
   (i) a concentrate conduit extending from said concentrate valve into fluid communication with said third water conduit means to form a mixing conduit for mixing concentrate and water;
   (j) pneumatic means operatively associated with said water motor pistons and said water motor valves to move said water motor piston to cause water to flow into or out of said first and second operating chambers of said first and second water motor valves and into said third conduit means;
   (k) pneumatic means operatively associated with said concentrate pump and said concentrate valve for causing concentrate to flow through said concentrate valve and into said mixing conduit;

(l) pneumatic valve means for actuating said pneumatic means; and (m) means connected to said reciprocating water motor piston for actuating said pneumatic valve means.

2. A system as defined in claim 1 wherein the stroke of the water motor piston is fixed and means is provided to change the stroke of the concentrate pump piston to vary the proportion of water and concentrate being mixed.

3. A system as defined in claim 2 having means connecting said water motor piston and said concentrate pump piston, said connecting means being adapted to change the stroke of said concentrate pump while the stroke of said water motor piston remains fixed.

4. A system as defined in claim 1 having:
   (i) an air supply line;
   (j) air lines connecting said air supply lines to said first and second water motor valves and to the means for controlling said concentrate control valve.

5. A system as defined in claim 1 wherein said concentrate pump includes means for removing air automatically.

* * * * *